United States Patent Office 3,585,062
Patented June 15, 1971

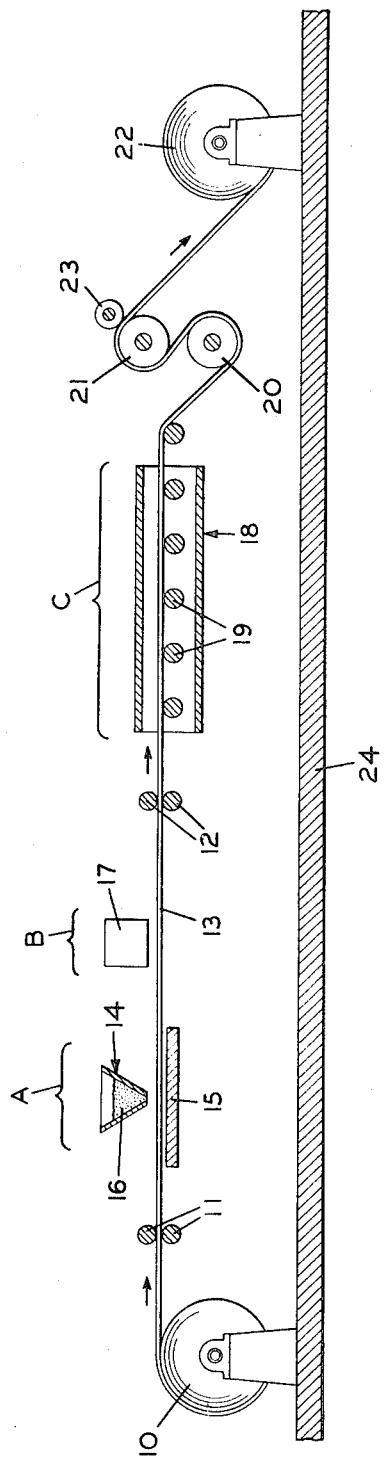

3,585,062
METHOD OF PRODUCING A HEAT-SEALABLE NON-THERMOPLASTIC FOAM MATERIAL
Frederick F. Hand, Wyckoff, and Peter M. Hay, Summit, N.J., assignors to J. P. Stevens & Co., Inc., New York, N.Y.
Filed July 18, 1967, Ser. No. 654,263
Int. Cl. C08g 53/20
U.S. Cl. 117—21                                        3 Claims

ABSTRACT OF THE DISCLOSURE

The process for producing a heat-sealable non-thermoplastic foam by applying to a non-thermoplastic foam material a thermoplastic resin in dry particulate solid form allowing the dry particulate resin to enter the cells of the foam, and thereafter sintering the particles to bring about adhesion of the dry solid particulate particles to the cell walls of the foam without substantially configuratively deforming the particle.

---

The present invention relates to a process for the production of a heat-sealable non-thermoplastic foam material. There are currently various procedures for producing thermoplastic foam materials, which materials, as is known, can be employed for a wide variety of purposes. These thermoplastic foam materials are derived from thermoplastic starting materials such as polyvinyl chloride, polypropylene, polyethylene, and the like.

The known processes for producing thermoplastic foam materials are generally expensive, time consuming, and in some cases hazardous. In addition, it is often difficult to control the cell size of the resultant thermoplastic foam material. An important advantage of thermoplastic foams, however, are that such foams can be welded or heat sealed, thus providing a wide range of uses. Non-thermoplastic foam materials are also available. These are less expensive, easier to produce, and can be produced having cells of varying and controlled sizes. However, the resultant non-thermoplastic foams are not heat-sealable, or heat-sealable only with additional processing, which according to present techniques is expensive and time consuming. In one technique for rendering a non-thermoplastic foam heat-sealable, the non-thermoplastic foam is treated with a plastisol of a thermoplastic resin which plastisol contains sufficient amounts of plasticizer to make the resin heat gelable. The plastisol is added to the non-thermoplastic foam material as a dispersion or paste. Difficulties are encountered employing this technique because the paste or dispersion does not uniformly and completely penetrate the cells of the foam except by an extremely slow commercially unattractive procedure.

Plastisol impregnated foam is also difficult to handle because a high proportion of foam strength is lost while the foam is in a wet condition which makes required subsequent conventional mechanical processing difficult. The product produced by this prior art procedure is also not entirely satisfactory. For example, the thermoplastic resin completely coats the cell walls of the urethane material in a manner such as to form a thermoplastic film within the urethane material which causes a stiffening of the final product.

It will thus be seen that there is still a need for a process for efficiently and economically rendering a non-thermoplastic foam material heat-sealable.

It is therefore an object of the present invention to provide a new and novel process for producing a heat-sealable non-thermoplastic foam material;

Another object is to provide a process for producing a heat-sealable non-thermoplastic foam material which process is economical and less time consuming than prior art processes;

A further object is to provide a process for producing a heat-sealable non-thermoplastic foam material without resulting in a significant loss of strength of the foam material;

Still another object is to provide a process for producing a heat-sealable non-thermoplastic foam material without resulting in a significant loss of resiliency of the foam material.

These and other objects will become apparent from the following description taken in conjunction with the accompanying drawings which diagrammatically illustrate a preferred method of conducting the process of the present invention.

Broadly contemplated, the process comprises applying to a non-thermoplastic foam material selected from the group consisting of polyurethane, urea-formaldehyde and rubber foams, a thermoplastic resin in dry particulate solid form, allowing said dry particulate solid resin to enter the cells of said foam, preferably by agitating said urethane foam, and thereafter sintering said particles to bring about adhesion of said dry solid particulate particles to the cell walls of said foam without substantially configuratively deforming said particles or said walls. The term sintering as used herein means the process of attaching solid particles to solid surfaces by heat-softening the particles and differs from gellation in that at no time is any of the material in a substantially liquid or fluid form.

For a clearer understanding of the invention reference is made to the drawings which show a sheet of foam material 10 which is to be treated by the process of the invention. The foam is supplied from a supply roll 10 mounted at the upstream or entrance end of the apparatus and can comprise polyurethane, urea-formaldehyde, rubber or other elastomer. The foam is preferably of the type wherein at least about 50% of the structure comprises open cells or pores. Foams of this type are available commercially from a wide variety of sources. There are also commercially available non-thermoplastic foams which have less than 50% open cells in the structure and this material can be processed to open the cells by subjecting the material to mechanical treatment such as by passing the foam through a pair of cooperating compressing rollers whereby the cells are split open. The foam can also be chemically treated to dissolve the thin cell walls ("windows") in a manner which is well known in the art.

The rate at which the foam material is advanced for treatment can be controlled by a series of strategically located feed rolls, one set of which is disposed downstream which supply roll 10 and which is generally indicated by reference numeral 11 and another set 12 disposed after the resin application zone A. Each of the rolls in a set is rotated by a power source (not shown) in a manner such as to advance the foam material downstream toward the exit end of the apparatus.

The foam material leaving the feed rolls 11 enters the resin application zone A wherein the resin is applied to the surface of the foam 13. It is important for proper practice of the present invention that the thermoplastic resin be employed in dry particulate solid form as contrasted to prior art techniques of employing the resin as a plastisol, i.e., a dispersion or paste. The proper selection of the type resin as well as the particle size will, of course, depend upon the type of foam material being employed, the thickness of the foam material as well as the cell size of the foam material. Generally the resin employed can be polyethylene, polypropylene, polyamides, polyvinyl chloride, or other powdered thermoplastic resins. Particularly outstanding results are obtained when the resin employed is a vinyl chloride-vinyl acetate copolymer to which no external plasticizer has been added. A particularly suitable resin is sold by the United States Rubber Company under the trademark Marvinol 60. This resin is a 15% acetate copolymer which means that there is approximately 85% of vinyl chloride and about 15% of vinyl acetate monomer, respectively in the final polymer.

As mentioned previously, the size of the particles employed will depend upon the pore size and other characteristics of the material being processed.

The dry particulate solids can be applied onto the surface of the urethane foam by any conventional procedure. Thus, the dry particulate solids can be applied by chemical, aerosol, or electrostatic means. In the drawing the resin is shown being applied to the urethane foam as it passes through the resin application Zone A. In the resin application zone A there is located a resin feed hopper 14 which contains the resin in dry particulate form. The hopper is of conventional type which has an outlet disposed over the advancing urethane foam which deposits the resin onto the advancing foam passing underneath. An important aspect of the invention is the vibration or agitation of the foam while the resin is being applied thereto. Various methods of agitating and/or vibrating the foam are well known in the art. For example, agitation may be accomplished by contact with a rotating bar of non-circular cross-section, i.e., square or hexagonal. In the drawing it will be seen that the vibrations are effected by means of a vibrating table 15 which vibrates as the foam 13 passes through the resin application zone beneath the hopper 14. The foam overlays the vibrating table in contact therewith and is subjected to vibration or agitation by a power source (not shown) such as to cause the dry resin particles 16 originally contained in the hopper 14 to enter the cells of the foam. As the foam leaves the resin application zone there will be amounts of resin which have not penetrated into the cells of the foam and which remain on the surface of the foam. It is important that this excess resin be removed from the surface since the resiliency of the final product can be affected by the presence of excess resin. Provision for removing the excess resin is provided by means of a conventional vacuum device 17 in the vacuum zone B. The excess resin is removed from the surface of the foam by the action of the vacuum device and the resin can thereafter be collected for re-use. After removal of the excess resin, the foam can thereafter be advanced into a heating zone C to sinter the particles or alternatively and preferably the foam enters a second resin application zone (not shown) wherein the preceding treatment is repeated on the opposite side of the foam.

In the heating zone C is located a heating device adapted to supply heat to the advancing foam material. The heating can be supplied by means of a heating duct which carries heating fluids such as heated gas streams into the area of the foam surface. Preferably, however, as shown in the drawing the heating is furnished by means of infrared units, generally indicated by reference numeral 18. Normally, the heating can be conducted at a temperature of about 100 to 200° C. which is sufficient to cause a sintering of the particles to bring about adhesion of the particles with the cell walls of the foam without substantially configuratively deforming the particles. The residence time of the foam within the heating zone would, of course, depend upon the temperature employed, the type of material being treated, and the length of the heating zone. Normally, the material is heated for about 1 to 2 minutes at a temperature with a range of about 150 to 175° C. The material is directed through the heating zone by means of rollers 19 over which the material passes. Upon leaving the heating zone, the foam material is directed around a pair of chill rolls 20, 21 disposed in vertical relation as shown in the drawing wherein the foam is cooled prior to takeup on the takeup rolls 22. If desired, the material can be compressed or crushed by providing a crush roll 23 immediately adjacent to the upper chill roll 21. This treatment softens the foam by breaking up any undesirable aggregations of sintered particles. The motion of the takeup roll 22, which is rotatably mounted on base 24 at the exit end of the apparatus, is synchronized with the feed rolls so that the material is treated under a slight tension.

The amount of resin employed in the process of the present invention depends upon the type of material being processed, the cell size, and other factors. Generally, however, there may be employed about 100 to 200 parts by weight resin based on 100 parts of the foam material; preferably, about 125 to 200 parts by weight.

There may also be incorporated with the resin conventional additives such as fillers, lubricants, stabilizers, and the like, provided the resultant resin remains in a dry particulate state. The finished product produced according to the process of the invention may be employed for a wide variety of uses. For example, the product can be employed in the automotive, clothing, shoe and upholstery industries. The product is susceptible to all conventional heat-sealing techniques known in the art, including, for example, dielectric heat sealing, thermal impulse sealing, and the like.

An advantage of the unplasticized copolymer is that it can be used with little pre-processing and it has more ability to absorb radio-frequency energy in dielectric heat-sealing. The resultant product has more resiliency than prior art foams of this type since the resin does not completely coat the cell walls, but rather adheres at the point of contact of the dry particulate resin with the cell wall, while substantially maintaining its original configuration.

It will be understood that various modifications and changes may be made in the embodiment and practice of the invention illustrated and described herein without departing from the scope of the invention as defined by the following claims.

What is claimed is:

1. A process for producing a heat-sealable non-thermoplastic foam material which comprises:
    (a) Preparing a non-thermoplastic foam material selected from the group consisting of polyurethane, urea-formaldehyde and rubber foams;
    (b) Depositing on said non-thermoplastic foam material a thermoplastic resin in dry particulate solid form;
    (c) Agitating said non-thermoplastic foam material during the deposition thereon of said thermoplastic resin to cause foam cells to open and permit thermoplastic particles to enter the open cells of said foam;
    (d) Substantially completely removing resin particles from the foam surface that have not penetrated open foam cells; and
    (e) Sintering said particles to cause adhesion to said dry solid particulate particles to the cell walls of said foam without substantially configuratively deforming said resin particles.

2. A process according to claim 1 wherein the resin is a copolymer of vinyl chloride and polyvinyl acetate.

3. A process according to claim 1 wherein said resin is employed in an amount of 100 to 200 parts by weight, based on 100 parts of foam material.

References Cited

UNITED STATES PATENTS 3,393,119  7/1968  Dugan _____ 117—98

FOREIGN PATENTS 853,030  11/1960  Great Britain ____ 260—2.5(M)

MURRAY TILLMAN, Primary Examiner

W. J. BRIGGS, SR., Assistant Examiner

U.S. Cl. X.R.

117—98, 138.8; 260—2.5, 853, 854, 859